US012389164B2

(12) United States Patent
Fujioka et al.

(10) Patent No.: US 12,389,164 B2
(45) Date of Patent: Aug. 12, 2025

(54) LOUDSPEAKER

(71) Applicant: Panasonic Intellectual Property Management Co., Ltd., Osaka (JP)

(72) Inventors: Kazuma Fujioka, Osaka (JP); Kengo Takeda, Osaka (JP); Tetsushi Itano, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 246 days.

(21) Appl. No.: 18/206,498

(22) Filed: Jun. 6, 2023

(65) Prior Publication Data

US 2023/0319482 A1 Oct. 5, 2023

Related U.S. Application Data

(63) Continuation of application No. PCT/JP2021/044361, filed on Dec. 2, 2021.

(30) Foreign Application Priority Data

Dec. 17, 2020 (JP) ................................. 2020-209634
Jan. 6, 2021 (JP) ................................. 2021-000995

(51) Int. Cl.
*H04R 9/06* (2006.01)
*H04R 9/02* (2006.01)
*H04R 9/04* (2006.01)

(52) U.S. Cl.
CPC ............... *H04R 9/06* (2013.01); *H04R 9/027* (2013.01); *H04R 9/043* (2013.01); *H04R 9/046* (2013.01)

(58) Field of Classification Search
CPC .......... H04R 9/06; H04R 9/027; H04R 9/043; H04R 9/046
See application file for complete search history.

(56) References Cited

U.S. PATENT DOCUMENTS

2009/0185711 A1 7/2009 Shigeta et al.
2010/0203918 A1 8/2010 Watanabe
(Continued)

FOREIGN PATENT DOCUMENTS

JP S58-68793 U 5/1983
JP H03-038999 A 2/1991
(Continued)

OTHER PUBLICATIONS

Office Action issued in Japanese Patent Application No. 2021-000995, dated Aug. 6, 2024, along with an English translation thereof.

(Continued)

*Primary Examiner* — Sunita Joshi
(74) *Attorney, Agent, or Firm* — GREENBLUM & BERNSTEIN, P.L.C.

(57) ABSTRACT

A loudspeaker including a magnetic circuit including a magnetic gap, a voice coil body inserted in the magnetic gap, a diaphragm attached to the voice coil body, transmission members arranged on a lateral side of the extend magnetic circuit along the magnetic circuit with a predetermined gap to transmit an electric signal to be input to the voice coil body, and a housing made of a resin and integrated with the magnetic circuit and the transmission members. The transmission members include externally exposed portions and internally exposed portions.

16 Claims, 5 Drawing Sheets

(56) References Cited

U.S. PATENT DOCUMENTS

| | | | | |
|---|---|---|---|---|
| 2014/0056468 | A1 | 2/2014 | Kuze et al. | |
| 2014/0105427 | A1* | 4/2014 | Watanabe | H04R 7/18 381/162 |
| 2015/0350791 | A1 | 12/2015 | Yang | |
| 2017/0280249 | A1* | 9/2017 | Choi | H04R 3/14 |
| 2020/0245072 | A1 | 7/2020 | Miyamoto et al. | |

FOREIGN PATENT DOCUMENTS

| | | | |
|---|---|---|---|
| JP | H03-177198 | A | 8/1991 |
| JP | H07-274285 | A | 10/1995 |
| JP | H09-307992 | A | 11/1997 |
| JP | H09-307993 | A | 11/1997 |
| JP | H11-41696 | A | 2/1999 |
| JP | 2001-326998 | A | 11/2001 |
| JP | 2002-199489 | A | 7/2002 |
| JP | 2009-171352 | A | 7/2009 |
| JP | 2014-033328 | A | 2/2014 |
| JP | 2015-226320 | A | 12/2015 |
| WO | 2009/016743 | A1 | 2/2009 |
| WO | 2013/108607 | A1 | 7/2013 |
| WO | 2019/073948 | A1 | 4/2019 |

OTHER PUBLICATIONS

Office Action issued in Japanese Patent Application No. 2020-209634, dated Aug. 6, 2024, along with an English translation thereof.

International Search Report issued in WIPO Patent Application No. PCT/JP2021/044361, dated Feb. 8, 2022, along with an English translation thereof.

Office Action mailed on Dec. 3, 2024, for corresponding Japanese patent application No. 2020-209634, together with an English translation thereof.

* cited by examiner

LOUDSPEAKER

CROSS REFERENCE TO RELATED APPLICATIONS

This is a continuation application of PCT International Application No. PCT/JP2021/044361 filed on Dec. 2, 2021, designating the United States of America, which is based on and claims priority of Japanese Patent Application No. 2020-209634 filed on Dec. 17, 2020, and Japanese Patent Application No. 2021-000995 filed on Jan. 6, 2021.

FIELD

The present disclosure relates to a loudspeaker which converts an electric signal to an acoustic sound.

BACKGROUND

Patent Literature (PTL) 1 discloses a loudspeaker including a magnetic circuit and a housing made of a resin, which are integrated by insert molding. PTL 2 discloses a loudspeaker including a damper including a conductor which transmits an electric signal, the damper being integrated with the conductor by insert molding.

CITATION LIST

Patent Literature

PTL 1: Japanese Unexamined Patent Application Publication No. H03-177198

PTL 2: Japanese Unexamined Patent Application Publication No. H09-307992

SUMMARY

However, the loudspeaker according to PTL 1 can be improved upon.

The present disclosure provides a loudspeaker capable of improving upon the above related art.

The loudspeaker according to an aspect of the present disclosure includes a magnetic circuit including a magnetic gap; a voice coil body arranged inserted in the magnetic gap; a diaphragm attached to the voice coil body; transmission members arranged on a lateral side of the magnetic circuit along the magnetic circuit with a predetermined gap to transmit an electric signal to be input to the voice coil body; and a housing made of a resin and integrated with the magnetic circuit and the transmission members. Here, the transmission members include externally exposed portions exposed outside the housing; and internally exposed portions exposed inside the housing.

The loudspeaker according to the present disclosure can be improved upon.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Figure 1:
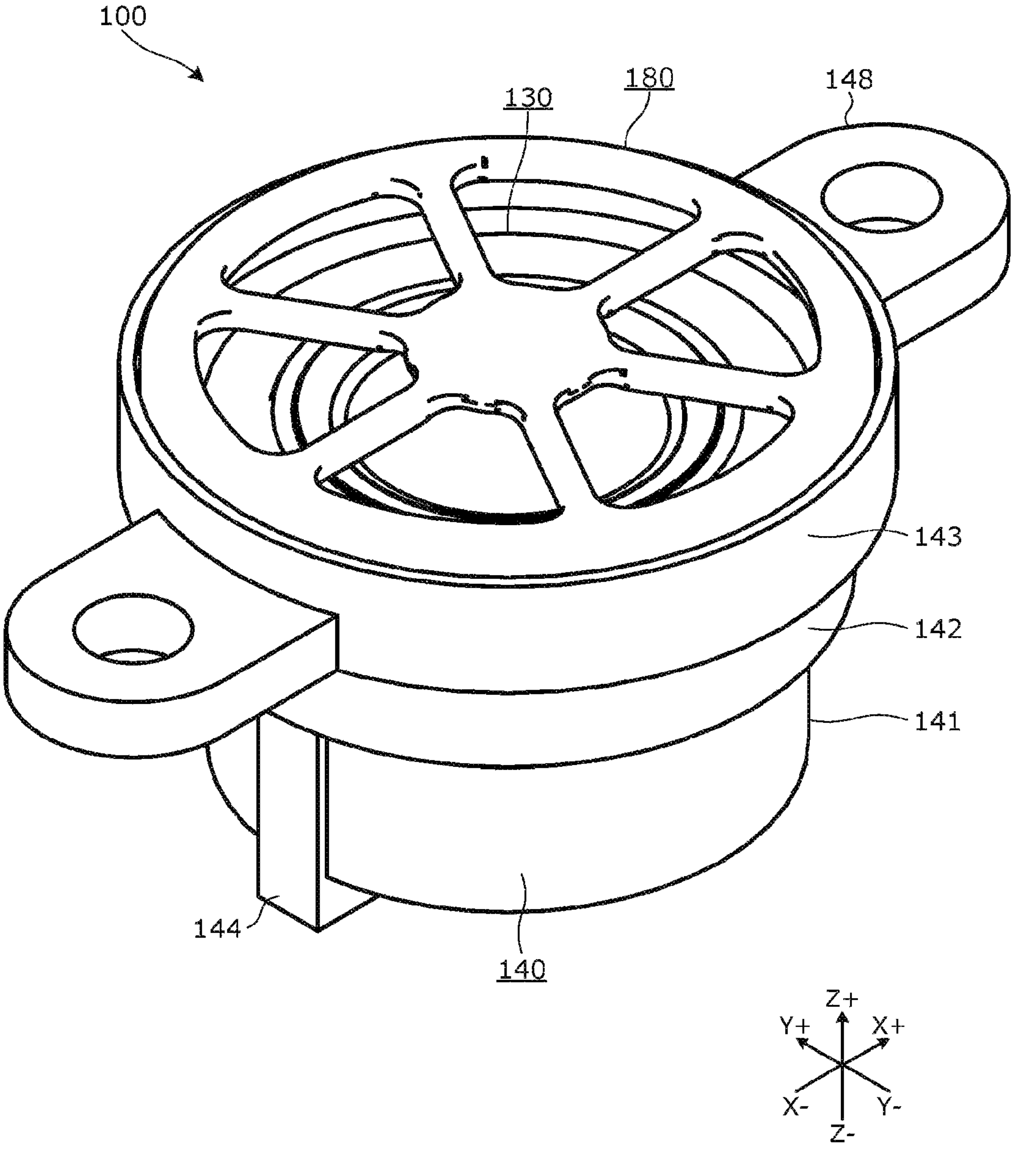
FIG. 1 is a perspective view illustrating the loudspeaker according to an embodiment viewed from the front side.

Hereinafter, an embodiment of the loudspeaker according to the present disclosure will be described with reference to drawings. The embodiment shown below is illustrative as examples to describe the present disclosure, and should not be construed as limitations to the present disclosure. For example, shapes, structures, materials, components, relatively positional relations, connection states, numeric values, expressions, contents of steps in methods, order of steps, and the like shown in the embodiments below are exemplary, and may contain contents not described below in some cases. When geometric expressions such as "parallel" and "orthogonal" are used, these expressions do not indicate mathematically strict meanings, and contain substantially allowable differences, deviations, and the like. Moreover, expressions such as "simultaneous" and "identical" also contain substantially allowable ranges.

The drawings are schematic diagrams subjected to appropriate emphasis, omission, or adjustment of ratios to describe the present disclosure, and have shapes, positional relations, and ratios different from actual shapes, positional relations, and ratios.

Hereinafter, a plurality of embodiments are generally described as one embodiment in some cases. Part of the contents described below will be described as optional components related to the present disclosure.

The loudspeaker according to one aspect of the present disclosure includes a magnetic circuit including a magnetic gap; a voice coil body arranged inserted in the magnetic gap; a diaphragm attached to the voice coil body; transmission members arranged on a lateral side of the magnetic circuit along the magnetic circuit with a predetermined gap to transmit an electric signal to be input to the voice coil body; and a housing made of a resin and integrated with the magnetic circuit and the transmission members. Here, the transmission members include externally exposed portions exposed outside the housing; and internally exposed portions exposed inside the housing.

According to this, because the transmission members extending along the magnetic circuit are integrated with the housing, breakage of the loudspeaker and drop-off of the transmission member can be avoided even when a force is applied, for example, when the externally exposed portion is pulled.

The loudspeaker according to another aspect of the present disclosure includes a magnetic circuit having a magnetic gap; a voice coil body arranged inserted in the magnetic gap; a diaphragm attached to the voice coil body; connection members connected to the voice coil body to transmit an electric signal to be input to the voice coil body; a housing which accommodates the magnetic circuit and the voice coil body; and a damper which connects the voice coil body to the housing. Here, the damper includes an outer ring which is in a ring shape and is attached to the housing; an inner ring which is in a ring shape and is attached to the voice coil body; and at least two arms each extending along a radial direction with respect to a winding axis of the voice coil body as a center to connect the outer ring to the inner ring, and each of the connection members extends along the radial direction with respect to the winding axis of the voice coil body as a center, penetrates through the outer ring and the inner ring, and is held between the at least two arms by the damper.

According to this, a loudspeaker which can transmit an electric signal to the voice coil body while the rolling phenomenon is suppressed can be provided.

Figure 2:
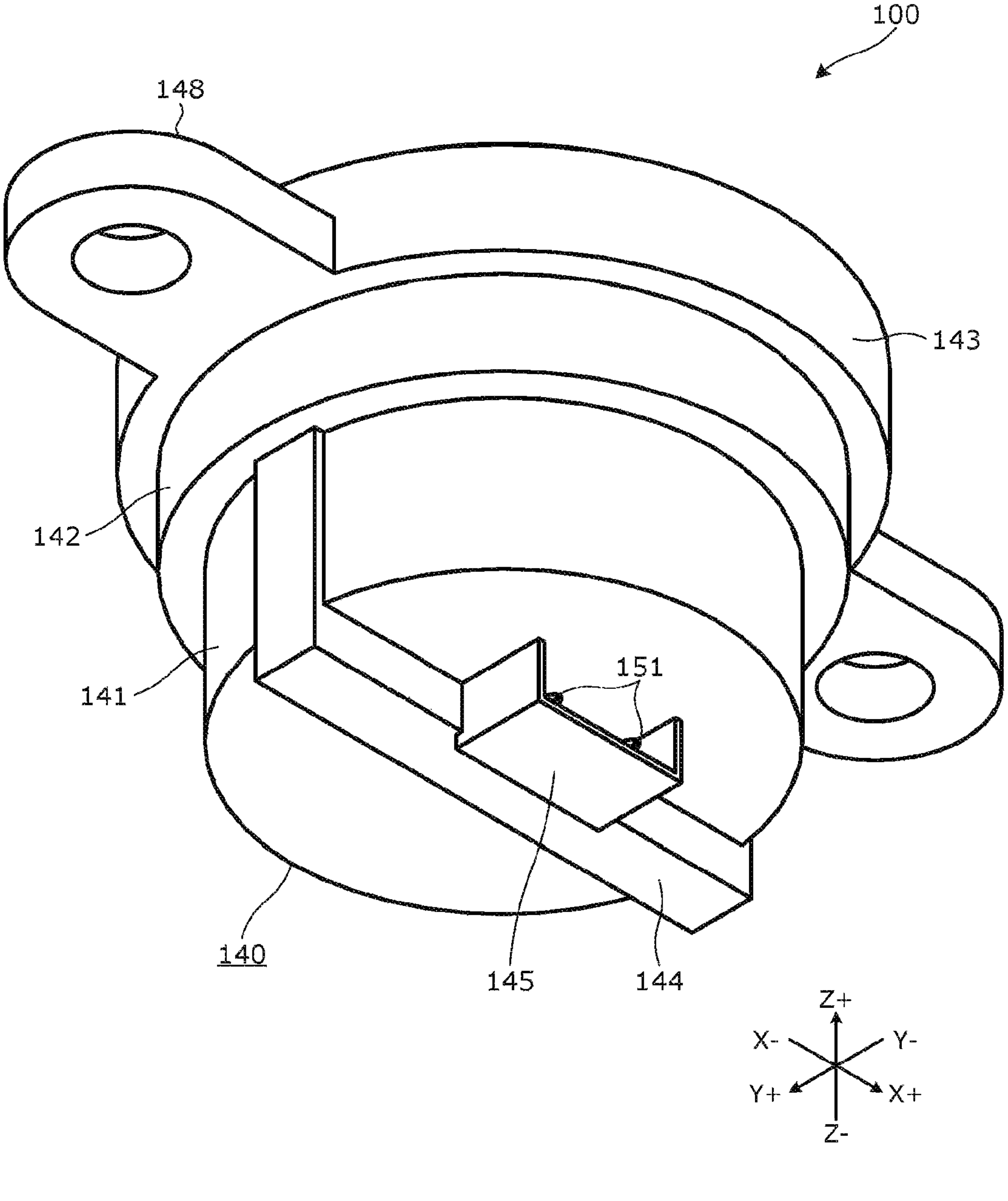
FIG. 2 is a perspective view illustrating the loudspeaker according to the embodiment viewed from the rear side.
Figure 3:
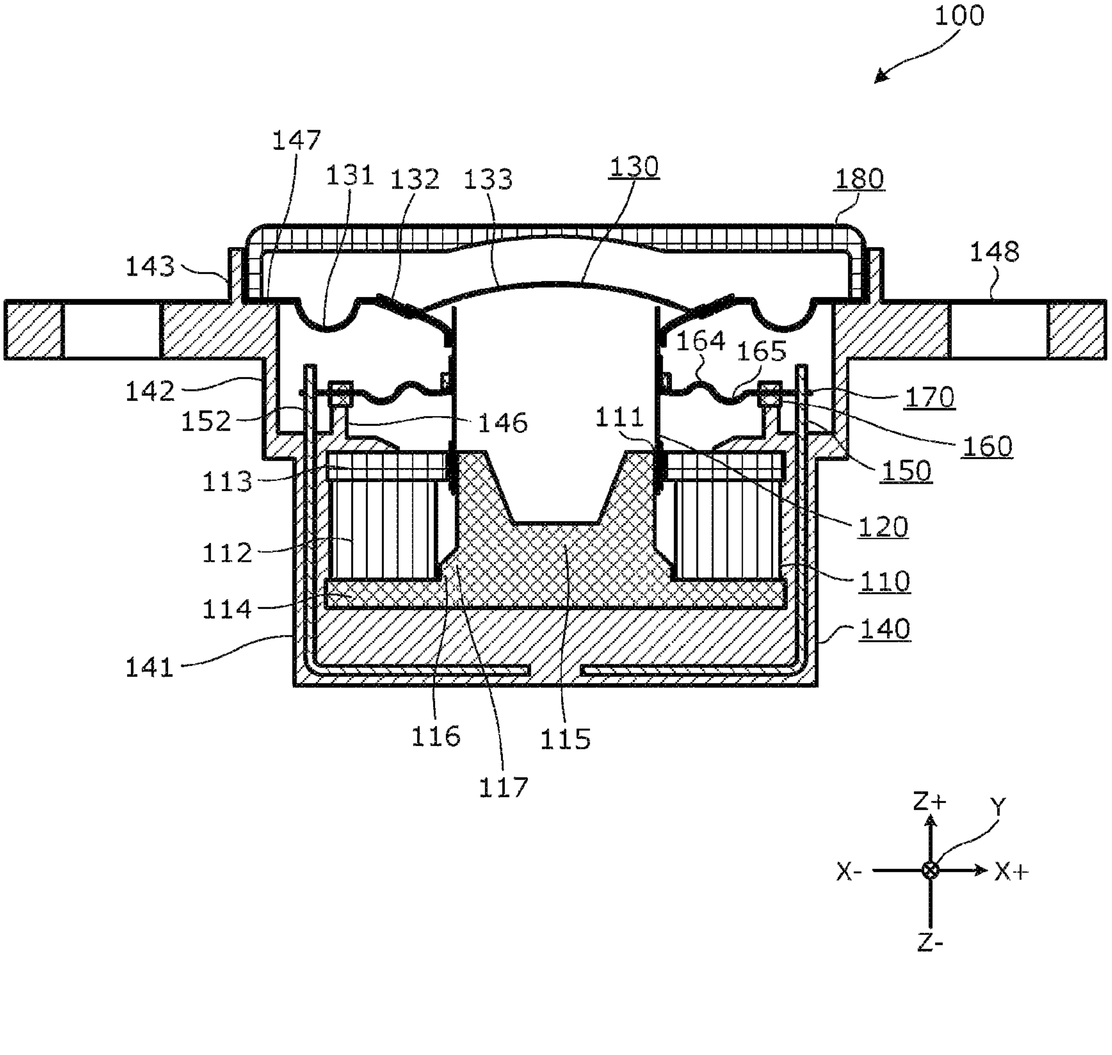
FIG. 3 is a cross-sectional view of the loudspeaker according to the embodiment.

FIG. 1 is a perspective view illustrating the loudspeaker according to an embodiment viewed from a front side. FIG. 2 is a perspective view illustrating the loudspeaker according to the embodiment viewed from a rear side. FIG. 3 is a cross-sectional view of the loudspeaker according to the embodiment. As illustrated in these drawings, loudspeaker 100 includes magnetic circuit 110, voice coil body 120, diaphragm 130, housing 140, and transmission members 150. In the case of the present embodiment, loudspeaker 100 includes damper 160, connection members 170, and cover 180. In this specification and CLAIMS, with respect to magnetic circuit 110, the side close to diaphragm 130 is expressed as the front side (Z+ side in the drawings), and the side close to diaphragm 130 is expressed as the rear side (Z− side in the drawings).

In the case of the present embodiment, loudspeaker 100 is illustrated as a loudspeaker provided on a moving body such as a vehicle. Loudspeaker 100 is a compact loudspeaker which can be embedded in a limited space of the moving body. In this specification, in some cases, the term "compact" is used to refer to a loudspeaker including housing 140 having an inner diameter of 10 cm or less. Although a compact loudspeaker is described, a large-sized loudspeaker may be used without limitation.

Magnetic circuit 110 is a part which generates a steady state magnetic flux in magnetic gap 111, the steady state magnetic flux acting on a magnetic flux which changes based on an electric signal input to voice coil body 120. Magnetic circuit 110 is integrally attached to housing 140 to be located behind diaphragm 130, and includes magnetic gap 111 which is in an annular shape and is opposite to diaphragm 130. Magnetic gap 111 is a gap in which a steady state magnetic flux is generated in the direction crossing the magnetic flux generated in voice coil body 120.

In the case of the present embodiment, magnetic circuit 110 is of an external magnet type, and includes magnet 112 which is in a ring shape (cylindrical shape), and is magnetized and arranged coaxially with the winding axis of voice coil body 120; front surface plate 113 which is in a ring shape and is arranged coaxially with the winding axis of voice coil body 120 on a surface of magnet 112 closer to diaphragm 130; and rear surface member 114 arranged on a rear surface side of magnet 112 opposite to front surface plate 113. Rear surface member 114 includes center pole 115 which is inserted from a central portion to a through hole of front surface plate 113 to define magnetic gap 111 with front surface plate 113. Rear surface member 114 and center pole 115 are integrally formed.

Front surface plate 113 and rear surface member 114 including center pole 115 are made of a magnetic material. Magnet 112 preferably used is a neodymium magnet having high magnetic energy, for example. This can reduce the thickness of magnet 112, and thus reduce the entire thickness of loudspeaker 100. Furthermore, the weight can also be reduced. Alternatively, loudspeaker 100 may have an external magnet type structure including a ferrite magnet.

In the case of the present embodiment, magnet 112 is a permanent magnet having a through hole through which center pole 115 is inserted. Magnet 112 has an N pole at one end thereof and an S pole at the other end thereof in the thickness direction (Z-axis direction in the drawings). Front surface plate 113 is fixed to a surface of magnet 112 corresponding to one of the poles, and rear surface member 114 is fixed to a surface corresponding to the other of the poles. The outer diameter of magnet 112 is set to be smaller than the outer diameter of front surface plate 113. The outer diameter of magnet 112 is set to be smaller than the maximum diameter of rear surface member 114 (excluding the portion corresponding to center pole 115). Specifically, the dimensional relation among the outer diameters of magnet 112, front surface plate 113, and rear surface member 114 is implemented by setting the maximum value of the dimensional tolerance of the outer diameter of magnet 112 to be smaller than the minimum values of the dimensional tolerances of the outer diameters of front surface plate 113 and rear surface member 114. When housing 140 is molded, a resin material is filled to the outer circumferential surface of magnet 112 which is a recessed portion of magnetic circuit 110, and magnetic circuit 110 is tightly held by housing 140 due to an anchoring effect.

The distal end of center pole 115 defines a magnetic gap, and the proximal end thereof serves as positioner 116 having a larger diameter than that of the distal end to position magnet 112 inserted during assembling of magnetic circuit 110. Magnet 112 is clearance fitted into positioner 116, and the dimensions are set such that the outer circumferential surface of magnet 112 is not projected from the outer circumferential surfaces of rear surface member 114 and front surface plate 113 even in the state where part of the inner circumferential surface of magnet 112 is in abutment with part of the outer circumferential surface of positioner 116.

Center pole 115 includes tapered portion 117 having a diameter reducing from positioner 116 toward the distal end to prevent chipping of magnet 112 when magnet 12 is inserted into center pole 115.

Voice coil body 120 is a part having one end arranged inside magnetic gap 111 of magnetic circuit 110 and the other end attached to diaphragm 130. Voice coil body 120 generates a magnetic flux based on an input electric signal, and vibrates in the winding axis direction (Z-axis direction in the drawings) as a result of interaction with a magnetic flux generated by magnetic circuit 110.

The winding axis (central axis) of voice coil body 120 is arranged in the direction of vibration (amplitude) of diaphragm 130 (Z-axis direction in the drawings), and intersects orthogonal to the direction of the magnetic flux inside magnetic gap 111.

In the case of the present embodiment, voice coil body 120 includes a coil configured of a single metallic wire material wound several times into an annular (cylindrical) shape, and a bobbin around which the coil is wound. The bobbin is a tubular member made of a material such as aluminum or a resin. The front end thereof is bonded to diaphragm 130, and the rear end thereof is arranged inside magnetic gap 111.

Voice coil body 120 included in loudspeaker 100 can be any other voice coil body than that described above, and a coil without a bobbin used in a microspeaker can be used, for example.

Diaphragm 130 is a member which is connected to voice coil body 120 and generates a sound by displacing diaphragm 130 in a back and forth direction (in the Z-axis direction in the drawings) from the neutral position based on the vibration of voice coil body 120 to vibrate the air. In the case of the present embodiment, the outer circumferential portion of diaphragm 130 includes edge 131 having flexibility and resiliency, connection 132 which is in a coned shape and includes a hole into which voice coil body 120 is inserted to connect edge 131 to voice coil body 120, and cap 133 which covers the hole of connection 132.

Diaphragm 130 can be in any shape without limitation, and examples of the shape thereof include circular cone shapes, oval cone shapes, and pyramidal shapes. Diaphragm 130 may be in a flat shape such as a circular plate shape, an oval plate shape, or a flat plate shape. Diaphragm 130 may be made of any material without limitation, and examples of the material include paper and resins. Diaphragm 130 may be a single member, rather than a plurality of divided parts.

Figure 4:
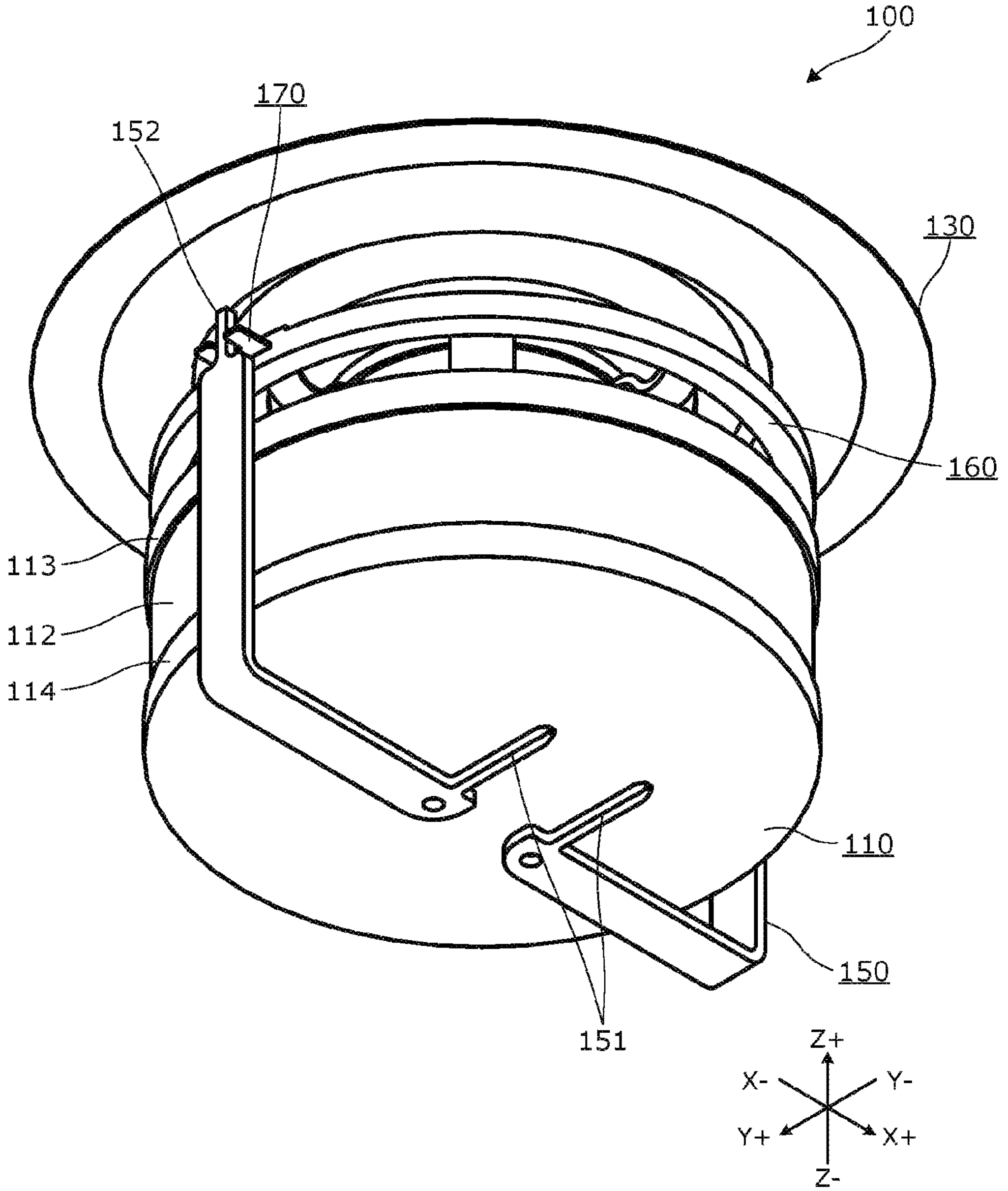
FIG. 4 is a perspective view illustrating the positional relation among a magnetic circuit, transmission members, and the like where a housing is omitted.

FIG. 4 is a perspective view illustrating the positional relation among the magnetic circuit, the transmission members, and the like where the housing is omitted. Transmission members 150 are members which extend on a lateral side of magnetic circuit 110 along magnetic circuit 110 with a predetermined gap, and transmit an electric signal to be input to voice coil body 120. Transmission members 150 each include externally exposed portion 151 exposed outside housing 140, and internally exposed portion 152 exposed inside housing 140.

In the case of the present embodiment, transmission member 150 is a plate-like thin metal member molded by punching a metal plate, and is bent in an L-shape extending to the rear surface side of magnetic circuit 110 from the lateral side of magnetic circuit 110. Such bending of elongated transmission members 150 allows transmission members 150 to be embedded inside housing 140 and integrated with housing 140. Such a configuration can enhance strength in attachment of transmission member 150 to housing 140. Transmission members 150 can be made of any material as long as they can transmit an electric signal. In the case of the present embodiment, brass or phosphorus bronze is used.

Two transmission members 150 are arranged in a positional relation of 180 degrees with respect to the winding axis of voice coil body 120 as a center. In such an arrangement, internally exposed portions 152 of transmission members 150 are symmetrically arranged with respect to the winding axis of voice coil body 120 as the center. Moreover, two connection members 170, each of which each electrically connects internally exposed portion 152 to voice coil body 120, are arranged radially with respect to the winding axis of voice coil body 120 as the center. In such a configuration, connection members 170 can suppress induction of the rolling phenomenon when voice coil body 120 reciprocally moves.

Externally exposed portion 151 of each transmission member 150 is projected in a direction crossing (orthogonal) to the bending direction of the body of transmission member 150. Two externally exposed portions 151 are parallel. Externally exposed portions 151 of transmission members 150 function as male connection terminals to be connected to an external connector (not illustrated). Internally exposed portions 152 each have a width smaller than that of the body of transmission member 150, and are inserted into forked portions at the distal ends of connection members 170.

Housing 140 is a box-shaped member which accommodates and holds magnetic circuit 110, and is integrated with magnetic circuit 110 and transmission members 150. In the case of the present embodiment, housing 140 as a whole is in a bottomed cylindrical shape, and integrally includes holding portion 141 which integrally holds magnetic circuit 110 and transmission members 150, intermediate portion 142 which accommodates damper 160 and the like, and frame 143 to which diaphragm 130 and cover 180 are attached. Moreover, housing 140 integrally includes projection 144 arranged along each transmission member 150 and projected outwardly from holding portion 141. By forming projection 144 on the surface of holding portion 141, strength of holding transmission member 150 is enhanced without increasing the total thickness of housing 140.

Moreover, housing 140 integrally includes connector frame 145 which is arranged to surround externally exposed portions 151 of transmission members 150 and is fitted to hold an external connector (not illustrated) electrically connected to externally exposed portions 151. Connector frame 145 is a portion to which an external connector for connecting loudspeaker 100 to an amplifier or the like is attached. When a male connector arranged at the distal end of the output cable of the amplifier is inserted to connector frame 145, connector frame 145 enables electrical connection of the male connector to externally exposed portions 151 projected inside connector frame 145. In such a configuration, when the electric wire connected to the external connector is pulled with a strong force, connector frame 145 can absorb and reduce a force applied to externally exposed portions 151. Thus, failure such as deviation of transmission member 150 from housing 140 can be prevented. To be noted, connector frame 145 may have a shape to function as a male connector.

Housing 140 includes damper attachment 146 which is in a ring shape coaxial with the winding axis of voice coil body 120 and is projected forwardly from the front side of magnetic circuit 110 and to which damper 160 is attached, and diaphragm attachment 147 which is arranged outside damper attachment 146 concentrically therewith and to which edge 131 of diaphragm 130 is attached. Damper attachment 146 and diaphragm attachment 147 are integrally arranged inside intermediate portion 142. Internally exposed portions 152 of transmission members 150 are exposed between damper attachment 146 and diaphragm attachment 147.

Housing 140 can be configured of any material. In the case of the present embodiment, housing 140 is an insert molded article made of polycarbonate. The embrittlement temperature of polycarbonate is −100° C. or less, and loudspeaker 100 including housing 140 made of polycarbonate can have durability against a significant temperature change. When housing 140 is molded, magnetic circuit 110 and transmission members 150 are attached by insert molding. Housing 140 includes fixation portion 148 which is arranged integrally therewith and has a through hole for attaching housing 140 to another structured body.

Figure 5:
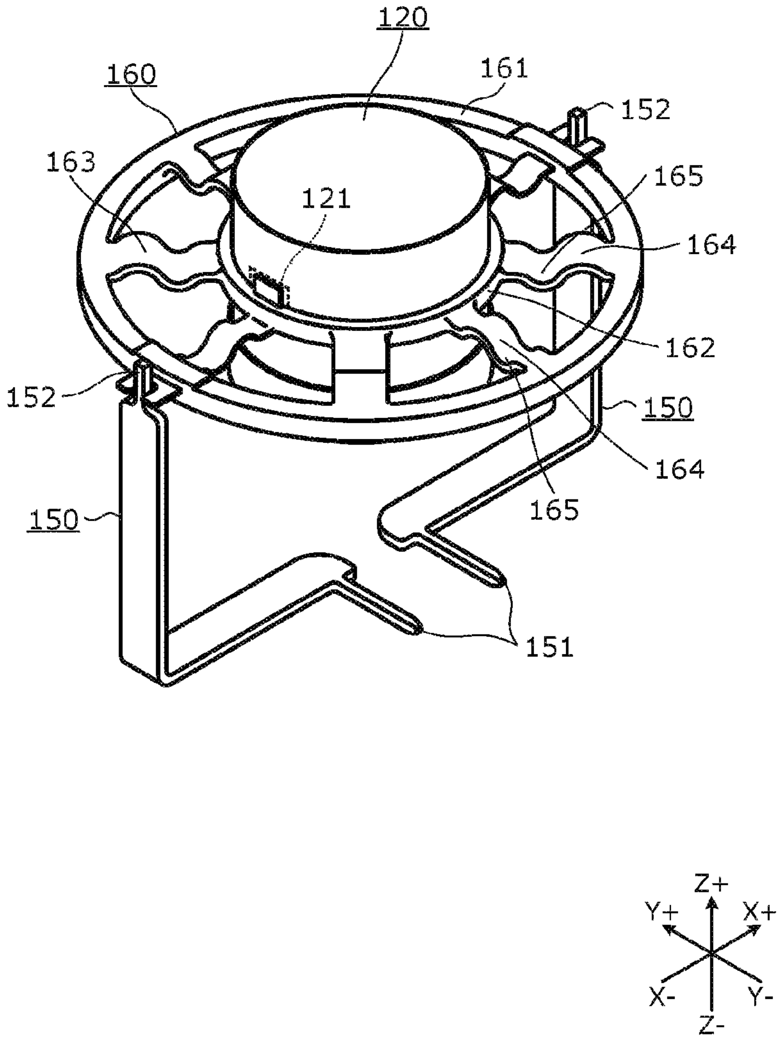
FIG. 5 is a perspective view illustrating a damper, a voice coil body, and transmission members.

FIG. 5 is a perspective view illustrating a damper, a voice coil body, and transmission members. Damper 160 is a member which assists linear moving of voice coil body 120 in the back and forth direction (Z-axis direction in the drawing), and includes outer ring 161, inner ring 162, and arms 163.

Outer ring 161 is a portion which is in ring shape and is attached to damper attachment 146 of housing 140. In the case of the present embodiment, outer ring 161 has a cross-section having a rectangular shape.

Inner ring 162 is a portion which is in ring shape and is attached to the outer circumferential surface of voice coil body 120, and is arranged concentrically (coaxially) with outer ring 161. In the case of the present embodiment, inner ring 162 has a cross-section having a rectangular shape as in outer ring 161. In the case of the present embodiment, the thickness of inner ring 162 in the diameter direction is smaller than that of outer ring 161, and the thickness thereof in the back and forth direction (Z-axis direction in the drawing) is also smaller than that of outer ring 161.

Arm 163 is a member which extends in a radial direction with respect to the winding axis of voice coil body 120 as the center to connect outer ring 161 and inner ring 162, which are arranged coaxially with the winding axis of voice coil body 120, like a bridge. It is sufficient that damper 160 includes at least two arms 163. In the case of the present embodiment, damper 160 includes six arms 163. Arms 163 are in a ribbon shape having a small thickness in the back and forth direction and a large width in the diameter direction, and are curved to form waves with respect to the winding axis of voice coil body 120 as the center. Such a configuration can ensure a long stroke of inner ring 162 reciprocally moving with voice coil body 120 with respect to outer ring 161. In other words, each arm 163 includes peak 164 forwardly projected and valley 165 backwardly recessed, peak 164 and valley 165 continuing in the diameter direction. In the case of the present embodiment, each arm 163 includes one peak 164 and one valley 165. When the curving state of a portion closer to outer ring 161 in one of adjacent arms 163 is peak 164, the curbing state of a portion closer to outer ring 161 in the other arm 163 is valley 165. That is, adjacent arms 163 in the diameter direction are curved to form waves, waves of one of adjacent arms 163 having phases opposite to those of waves of the other thereof. Adjacent arms 163 have different widths in the circumferential direction. In the case of the present embodiment, damper 160 includes four arms 163 having a larger width and two arms 163 having a smaller width. Arm 163 having a smaller width is arranged between two arms 163 having a larger width at an interval of 45 degrees. Two sets of arms 163 thus arranged are arranged at an interval of 180 degrees. Although in the case of the present embodiment, one arm 163 has the same width in the diameter direction, arm 163 may have a width varying in the diameter direction, for example, may be in a fan shape.

Each of connection members 170 is a member which is connected to voice coil body 120 to transmit an electric signal to be input to voice coil body 120, and extends in a radial direction with respect to the winding axis of voice coil body 120 as the center. Each of connection members 170 penetrates through outer ring 161 and inner ring 162, and is held between arms 163 by damper 160. In the case of the present embodiment, connection members 170 are each in a ribbon shape having a smaller thickness in the back and forth direction and a larger width in the diameter direction. As in arm 163, each connection member 170 includes one peak and one valley, and is curved to form waves having phases opposite to those of the waves of adjacent arms 163 in the diameter direction. Connection member 170 has a width in the circumferential direction different from those of adjacent arms 163, and the width of connection member 170 is close to the width of arm 163 having a smaller width. Although in the case of the present embodiment, one connection member 170 has the same width in the diameter direction, connection member 170 may have a width varying in the diameter direction, for example, may be in a fan shape.

As described above, in damper 160, connection members 170 and arms 163 are arranged in a radial direction with respect to the winding axis of voice coil body 120 as the center at an interval of 45 degrees, and arm 163 having a smaller width or connection member 170 is arranged between arms 163 which have a larger width and are arranged at an interval of 90 degrees. Arms 163 and their adjacent connection member 170 are curved to form waves having phases opposite to each other in the back and forth direction. Damper 160 is made of a resin, and outer ring 161, inner ring 162, and arms 163 are integrally molded. Connection members 170 are insert molded when damper 160 is integrally molded, and are integrated with damper 160.

Connection member 170 can be configured of any material as long as it can transmit an electric signal. Connection member 170 demonstrates the same function as that of arm 163, and is present as part of damper 160. Accordingly, connection member 170 is preferably an elastic member having flexibility and resiliency. In the case of the present embodiment, brass or phosphorus bronze is used as in transmission member 150. To be noted, to have flexibility and resiliency identical to those of arm 163 made of a resin, connection member 170 has a thickness smaller than that of arm 163 made of a resin.

Cover 180 is arranged on the front side of diaphragm 130 to protect diaphragm 130. Edge 131 is clamped between cover 180 and diaphragm attachment 147 to improve attachment strength of diaphragm 130.

Next, a method of producing loudspeaker 100 will be described. Magnetic circuit 110 and transmission members 150 are placed in a mold, polycarbonate for forming housing 140 is injected into the mold, followed by insert molding. Thus, an intermediate part is produced. This method enables one-step production of an intermediate part in which magnetic circuit 110 and transmission members 150 are held by housing 140 in a predetermined positional relation while insulation is ensured, thereby significantly simplifying the entire assembling process of loudspeaker 100.

Voice coil body 120 is inserted into the hole of inner ring 162 of damper 160 until it reaches a predetermined position. The predetermined position indicates a position where ends of connection members 170 each penetrating through inner ring 162 and projecting to the front side (or the rear side) of inner ring 162 are in abutment with terminals 121 arranged on the outer circumferential surface of voice coil body 120. Terminals 121 are electrically connected to the ends of the coil of voice coil body 120. Voice coil body 120 and damper 160 are bonded with an adhesive or the like. Connection members 170 and terminals 121 of voice coil body 120 are electrically connected with solder or the like.

Connection 132 of diaphragm 130 is attached to voice coil body 120, and cap 133 is attached to connection 132.

Next, outer ring 161 of damper 160 is attached to damper attachment 146 of housing 140, and voice coil body 120 is arranged inserted in the magnetic gap of magnetic circuit 110. At this time, internally exposed portions 152 of transmission members 150 are inserted to the forked portions of the distal ends of connection members 170 to position damper 160 and voice coil body 120 with respect to housing.

Next, internally exposed portions 152 of transmission members 150 are electrically connected to connection members 170 with solder or the like. Next, edge 131 is attached to connection 132 and diaphragm attachment 147 with an adhesive or the like. Finally, cover 180 is inserted into frame 143 of housing 140, and is attached to housing 140 to press the periphery of edge 131. Thus, loudspeaker 100 is assembled.

In loudspeaker 100 described above, the material and shape of connection member 170 are set such that connection member 170 connects outer ring 161 of damper 160 and inner ring 162 thereof like a bridge to demonstrate the same function as that of arm 163. Thus, the total weight of damper 160 and the elasticity performance thereof are balanced, enabling suppression of the rolling phenomenon of voice coil body 120.

Moreover, connection members 170 are integrated with outer ring 161, inner ring 162, and arms 163 by insert molding. Such a configuration can stabilize precision of the positional relation between arms 163 and connection member 170, further enabling suppression of the rolling phenomenon of voice coil body 120. Moreover, the process of assembling loudspeaker 100 can be simplified.

In addition, transmission members 150 extending on at least the lateral side of magnetic circuit 110 and magnetic circuit 110 are integrated with housing 140. Thus, positional deviation of transmission member 150 with respect to housing 140 or drop-off of transmission member 150 from housing 140 can be suppressed even when externally exposed portion 151 of transmission member 150 receives a strong force. Because a worker does not assemble housing 140, transmission members 150, and magnetic circuit 110, precision of their positional relation can be stabilized, and the process of assembling loudspeaker 100 can be simplified.

Because the diameter of the outer circumferential surface of magnet 112 is smaller than those of the outermost circumferential surfaces of front surface plate 113 and rear surface member 114, a resin can be filled into the space between front surface plate 113 and rear surface member 114, and thus magnetic circuit 110 can be tightly fixed to housing 140 due to an anchoring effect.

Because transmission members 150 are symmetrically arranged in a positional relation of 180 degrees, a resin can be evenly injected near transmission members 150 during insert molding, and thermal impact or the like can be relaxed.

To be noted, the present disclosure is not limited to the embodiment above described. For example, embodiments according to the present disclosure may include embodiments including any combination of the components described in this specification, and other embodiments implemented by excluding some of the components. The present disclosure also covers modifications obtained by subjecting the above embodiment to a variety of modifications conceived by persons skilled in the art without departing from the gist of the present disclosure, namely, without departing from the meanings of the terms and expressions described in CLAIMS.

For example, although arms 163 of damper 160 excluding connection members 170 integrated with damper 160 have been described as portions made of a resin and integrated with outer ring 161 and inner ring 162, at least two of arms 163 may be made of a metal identical to that of connection members 170. In this case, arms 163 made of a metal other than connection members 170 are not electrically connected to voice coil body 120, and function as dummies of connection members 170.

Loudspeaker 100 can include any type of magnetic circuit 110, and magnetic circuit 110 of an internal magnet type may be used.

Although the case where magnetic circuit 110 and transmission members 150 are integrated with housing 140 has been described, magnetic circuit 110 and transmission members 150 may be separated from housing 140, and magnetic circuit 110 may be assembled by a worker or the like. Housing 140 may be made of a material other than a resin.

To reduce the lowest resonance frequency of loudspeaker 100 and improve the sound quality, loudspeaker 100 may have a damperless configuration.

Alternatively, damper 160 may be attached to diaphragm 130, rather than to voice coil body 120.

FURTHER INFORMATION ABOUT TECHNICAL BACKGROUND TO THIS APPLICATION

The disclosures of the following patent applications including specification, drawings, and claims are incorporated herein by reference in their entirety: Japanese Patent Application No. 2020-209634 filed on Dec. 17, 2020, and Japanese Patent Application No. 2021-000995 filed on Jan. 6, 2021, and PCT International Application No. PCT/JP2021/044361 filed on Dec. 2, 2021.

INDUSTRIAL APPLICABILITY

The present disclosure can be used as loudspeakers which convert an electric signal to an acoustic sound.

The invention claimed is:

1. A loudspeaker comprising:

a magnetic circuit including a magnetic gap;

a voice coil body arranged inserted in the magnetic gap;

a diaphragm attached to the voice coil body;

transmission members arranged on a lateral side of the magnetic circuit along the magnetic circuit with a predetermined gap to transmit an electric signal to be input to the voice coil body, the transmission members extending to a rear surface side of the magnetic circuit from the lateral side of the magnetic circuit; and a housing made of a resin and integrated with the magnetic circuit and the transmission members, wherein the transmission members include:

externally exposed portions exposed outside the housing; and internally exposed portions exposed inside the housing.

2. The loudspeaker according to claim 1, wherein the externally exposed portions of the transmission members are connection terminals to be connected to an external connector, and the housing integrally includes a connector frame which holds the external connector.

3. The loudspeaker according to claim 1, wherein the transmission members are each a metal plate.

4. The loudspeaker according to claim 1, wherein the transmission members which total two are arranged in a positional relation of 180 degrees with respect to a winding axis of the voice coil body as a center.

5. The loudspeaker according to claim 1, wherein the magnetic circuit includes:

a magnet which is an a ring shape and is arranged coaxially with the winding axis of the voice coil body;

a rear surface member arranged on a rear surface side of the magnet; and a front surface plate which is in a ring shape and is arranged on a front surface side of the magnet coaxially with the winding axis, and the magnet has an outer diameter smaller than an outer diameter of the front surface plate.

6. The loudspeaker according to claim 1, wherein the magnetic circuit includes:

a magnet which is in a ring shape and is arranged coaxially with the winding axis of the voice coil body;

a rear surface member arranged on the rear surface side of the magnet; and a front surface plate which is in a ring shape and is arranged on a front surface side of the magnet coaxially with the winding axis, and the rear surface member includes:

a positioner inserted in the magnet to position the magnet; and a tapered portion having a diameter reducing from the positioner toward a front direction.

7. The loudspeaker according to claim 1, wherein the housing integrally includes:

a damper attachment which is in a ring shape coaxial with the winding axis of the voice coil body and is projected forwardly from a front side of the magnetic circuit and to which a damper is attached; and a diaphragm attachment which is arranged outside the damper attachment concentrically with the damper attachment and to which the diaphragm is attached, and each of the internally exposed portions of the transmission members is exposed between the damper attachment and the diaphragm attachment.

8. The loudspeaker according to claim 1, wherein the housing is formed of polycarbonate.

9. A loudspeaker comprising:

a magnetic circuit having a magnetic gap;

a voice coil body arranged inserted in the magnetic gap;

a diaphragm attached to the voice coil body;

connection members connected to the voice coil body to transmit an electric signal to be input to the voice coil body;

a housing which accommodates the magnetic circuit and the voice coil body; and a damper which connects the voice coil body to the housing, wherein the damper includes:

an outer ring which is in a ring shape and is attached to the housing;

an inner ring which is in a ring shape and is attached to the voice coil body; and at least two arms each extending along a radial direction with respect to a winding axis of the voice coil body as a center to connect the outer ring to the inner ring, and each of the connection members extends along the radial direction with respect to the winding axis of the voice coil body as a center, penetrates through the outer ring and the inner ring, and is held between the at least two arms by the damper.

10. The loudspeaker according to claim 9, wherein the connection members are curved to form waves with respect to the winding axis as the center.

11. The loudspeaker according to claim 9, wherein the at least two arms are curved to form waves with respect to the winding axis as the center.

12. The loudspeaker according to claim 10, wherein the at least two arms adjacent to each other are curved to form waves, waves of one of the at least two arms having phases opposite to phases of waves of an other of the at least two arms.

13. The loudspeaker according to claim 9, wherein the at least two arms adjacent to each other have different widths in a circumferential direction.

14. The loudspeaker according to claim 9, wherein the at least two arms are made of a metal.

15. The loudspeaker according to claim 9, wherein the outer ring, the inner ring, and the at least two arms are integrated, and the connection members are insert molded when the damper is formed.

16. The loudspeaker according to claim 15, wherein each of the connection members is insert molded with the outer ring and the inner ring.

* * * * *